United States Patent
Amada et al.

[11] Patent Number: 5,414,567
[45] Date of Patent: May 9, 1995

[54] MAGNETIC RECORDING AND REPRODUCING DEVICE

[75] Inventors: Nobutaka Amada; Toshifumi Takeuchi; Akira Abeta; Takao Arai, all of Yokohama; Kouei Usuda, Ibaraki, all of Japan

[73] Assignee: Hitachi, Ltd., Tokyo, Japan

[21] Appl. No.: 625,822

[22] Filed: Dec. 11, 1990

[30] Foreign Application Priority Data

Dec. 13, 1989 [JP] Japan .................. 1-321426

[51] Int. Cl.[6] .............................. H04N 5/78
[52] U.S. Cl. ..................... 360/19.1; 360/9.1; 360/66
[58] Field of Search ............... 360/19.1, 66, 33.1, 360/9.1; 358/343, 330, 319, 320

[56] References Cited

U.S. PATENT DOCUMENTS

| | | | |
|---|---|---|---|
| 4,038,692 | 7/1977 | Umeda et al. | 360/65 |
| 4,380,779 | 4/1983 | Kitamura et al. | 360/19.1 |
| 4,422,109 | 12/1983 | Sampei et al. | 360/66 |
| 4,594,616 | 6/1986 | Dischert | 360/9.1 |
| 4,679,097 | 7/1987 | Tomita | 358/330 |
| 4,758,903 | 7/1988 | Noguchi et al. | 360/19.1 |
| 4,882,725 | 11/1989 | Noda et al. | 358/343 |
| 4,979,052 | 12/1990 | Matsuta et al. | 360/32 |
| 4,982,302 | 1/1991 | Kitamoto et al. | 360/59 |
| 5,063,452 | 11/1991 | Higurashi | 358/343 |
| 5,124,852 | 6/1992 | Suwa et al. | 360/19.1 |

FOREIGN PATENT DOCUMENTS

| | | |
|---|---|---|
| 0277000 | 8/1988 | European Pat. Off. |
| 2510590 | 9/1975 | Germany |
| 2938937 | 4/1980 | Germany |
| 1-105301 | 4/1989 | Japan |
| 1-303602 | 12/1989 | Japan |

OTHER PUBLICATIONS

English Abstract of Japanese Kokai 60-195704 published Oct. 4, 1985.

Primary Examiner—Aristotelis Psitos
Assistant Examiner—Varsha A. Kapadia
Attorney, Agent, or Firm—Antonelli, Terry, Stout & Kraus

[57] ABSTRACT

A magnetic recording method and apparatus which performs a quadrature phase shift keying operation on a digital information signal, superimposes a high frequency bias signal on the performed signal, records the resulting signal into a deep portion of a magnetic layer of a magnetic tape with a first rotational head, and records a video signal in a surface portion of the magnetic layer above a track formed by the former recording, with a second rotational head which is different in azimuth angle from the first rotational head, the frequency of the high frequency bias signal being set to a value which is about four times as high as the carrier frequency of the quadrature phase shift keyed digital information signal, thereby eliminating a 5th-order distortion component due to cross modulation of the high frequency bias signal and the carrier frequency.

37 Claims, 8 Drawing Sheets

MAGNETIC RECORDING AND REPRODUCING DEVICE

BACKGROUND OF THE INVENTION

The present invention relates to magnetic recording and reproducing devices and methods, and more particularly to a magnetic recording and reproducing device and method which records high-quality digital audio signals in a multiplexed manner while maintaining the compatibility with the existing systems.

As disclosed in Unexamined Japanese patent Publication JP-A Heisei 1-105301, a conventional magnetic recording and reproducing device multiplexes a frequency-modulated audio signal and a quadrature phase shift keyed digital audio signal in a frequency divisional manner, further superimposes a high frequency bias signal on them, records those signals into a deep portion of a magnetic layer of a magnetic tape with a rotational audio head and superimposes a video signal with a rotational video head which is different in azimuth angle from the rotational audio head into an upper surface portion of the magnetic layer above the track formed by that recording.

However, the conventional technique does not allow for the relationship between the carrier frequency fp of the digital audio signal and the frequency fB of the high frequency bias signal. Thus, it has the problem that a 5th-order distortion (4×fp−fB) component due to cross modulation of the digital audio signal and bias signal adversely influences the FM audio signal and video signal.

The conventional technique does not allow for the magnetic gap length of the rotational audio head either and has a problem with ensuring a reproduced output level of the digital audio signal.

The magnetic gap length of the existing rotational audio heads is about 1.1–1.3 μm, which allows for only recording and reproducing the FM audio signal. If the digital audio signal is recorded and reproduced using that magnetic gap length, the reproduced output of the digital audio signal is reduced due to so-called gap loss and hence a required C/N (Carrier to Noise) ratio cannot be ensured.

It is an object of the present invention to provide a magnetic recording and reproducing method and device which eliminates the drawbacks of the conventional techniques, eliminates adverse influence of distortion components due to cross modulation of the digital audio signal and bias signal on the FM audio signal and video signal, and ensures the reproduced output level of the digital audio signal.

SUMMARY OF THE INVENTION

In order to achieve the above objects, in the present invention, the frequency fB of the bias signal is set to a value which is four times as high as the carrier frequency fp of the digital audio signal.

The magnetic gap length of the rotational audio head is set to one half to one third of the recorded wavelength of the digital audio signal (λp=v/fp where v is the relative speed of the rotational audio head and a magnetic tape).

If the frequency fB of the bias signal is set to a value which is four times as high as the carrier frequency fp of the digital audio signal, the 5th-order distortion (4×fp−fB) component due to cross modulation of the digital audio signal and bias signal is 0 Hz or a DC component, which is not reproduced, so that no adverse influence on the FM audio signal and video signal do not occur.

Reduction of the magnetic gap length of the rotational audio head to about one half to one third of the recorded wavelength λp of the digital audio signal greatly reduces a gap loss produced during reproduction without reducing the recording sensitivity significantly. As a result, the reproduced output level is ensured. Further reduction of the magnetic gap length reduces the recording sensitivity rather than reduction of the gap loss to thereby reduce the reproduced output level.

BRIEF DESCRIPTION OF THE DRAWINGS

FIGS. 2A, 2B are representations of the spectra of a recorded video signal and a recorded audio signal, respectively, in the device of FIG. 1;

DESCRIPTION OF THE PREFERRED EMBODIMENTS

Embodiments of the present invention will be described hereinafter with reference to the drawings.

Figure 1:
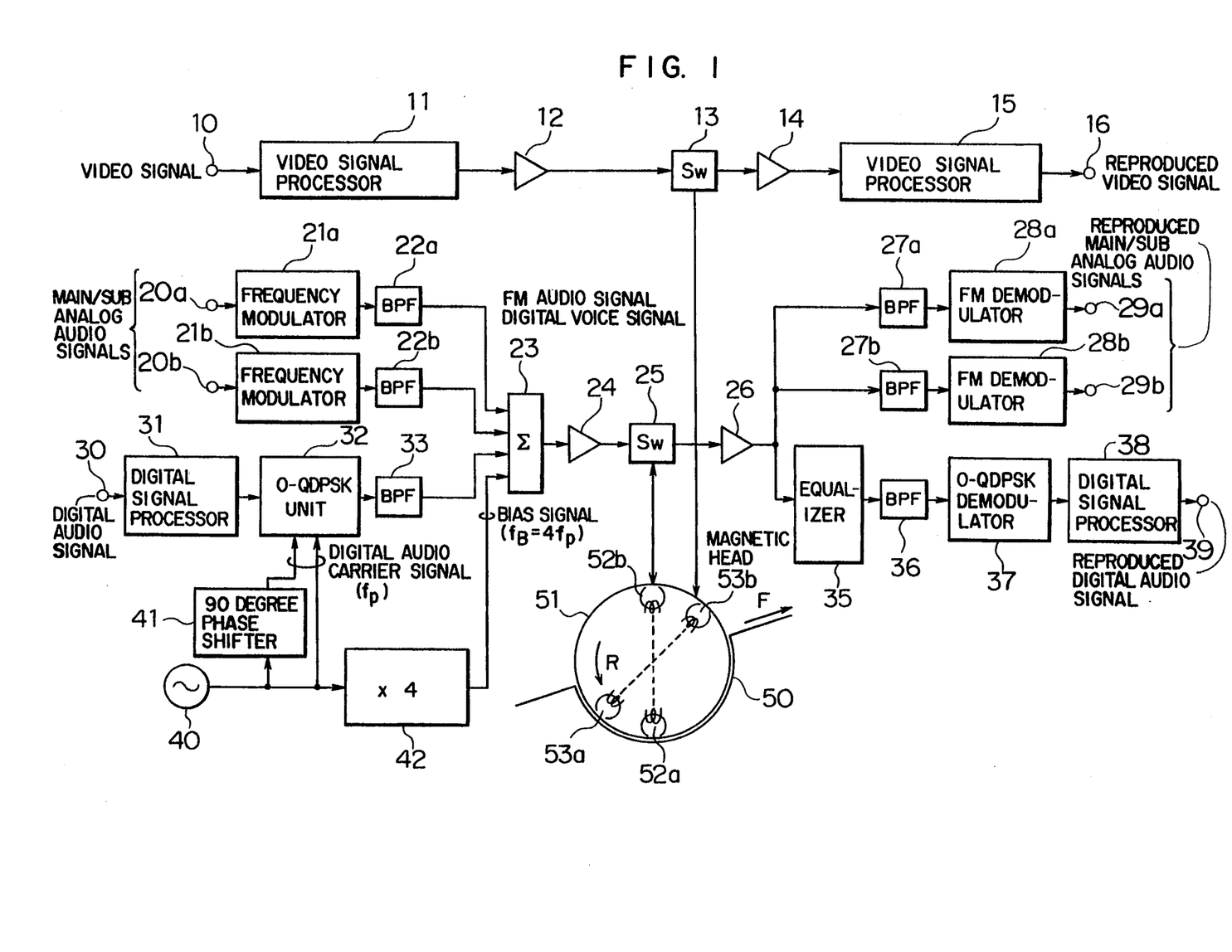
FIG. 1 is a block diagram of one embodiment of a magnetic recording and reproducing device for carrying out a magnetic recording and reproducing method according to the present invention.

FIG. 1 is a block diagram of one embodiment of a magnetic recording and reproducing device which carries out a magnetic recording and reproducing method according to the present invention. In FIG. 1, a video signal processor 11 converts a video signal received at input terminal 10 to a frequency-divided multiplexed video recording signal of a frequency-modulated luminance signal and a down converted chrominance signal.

Figure 2A:
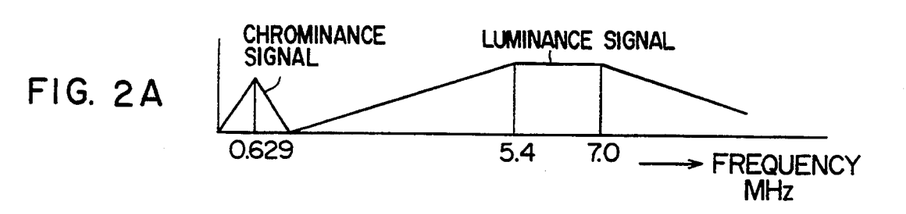

FIG. 2A illustrates the spectrum of the video record signal. For example, the carrier frequency band of the FM luminance signal is 5.4–7.0 MHz and the carrier frequency of the down converted chrominance signal is about 629 kHz.

Two right and left or main and sub channel analog audio signals received at input terminals 20a, 20b are subjected to frequency modulation, for example, the left or main channel signal is modulated with a 1.3 MHz carrier frequency and the right or sub channel signal is subjected to frequency modulation with a 1.7 MHz carrier frequency.

A digital signal processor 31 performs a formatting operation such as addition of a synchronizing signal and error correction codes and an interleaving operation on a digital audio signal received at input terminal 30 and delivers the resulting signal to an O-QDPSK (Offset Quadrature Differential Phase Shift Keying) modulator 32.

O-QDPSK modulator 32 performs a modulating operation on the digital audio signal using well-known techniques including serial-to-parallel conversion, differential encoding and quadrature modulation. Modulator 32 receives the output signals of a carrier oscillator 40 and the output signal of a 90-degree phase shifter 41 as quadrature modulation carrier signals. Two channel frequency-modulated audio signals and the O-QDPSK digital audio signal are delivered through band-pass filters (BPFs) 22a, 22b and 33 to an adder 23 which multiplexes the received FM audio signals and digital audio signal at an appropriate level ratio in a frequency divisional manner. The above structure is similar to the conventional one.

The present embodiment is characterized by the phase synchronization of a high frequency bias signal with a frequency which is 4 times as high as the carrier frequency fp of the digital audio signal. The high frequency bias signal is applied to adder 23 where it is superimposed on the FM audio signals and digital audio signal multiplexed in a frequency division manner.

Figure 2B:
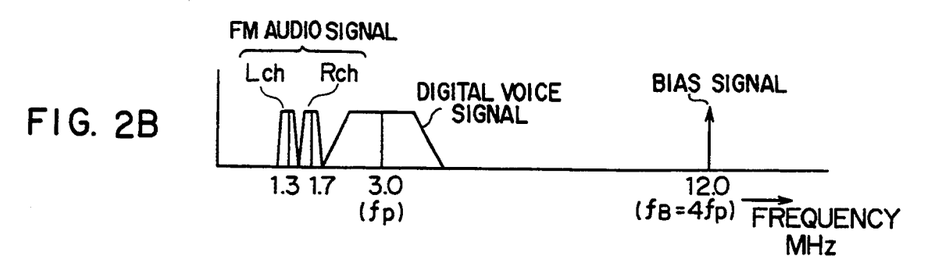

FIG. 2B shows a spectrum of the output signal of adder 23 which will be an audio recording signal. For example, the carrier frequency fp of the digital audio signal is 3 MHz and the bias frequency fB is 4×fp=12 MHz.

Figure 3:
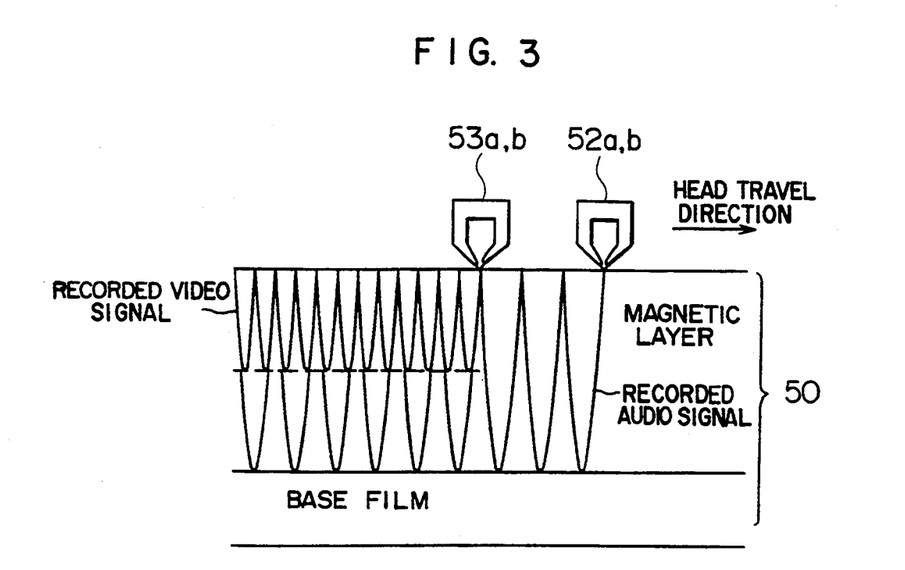
FIG. 3 conceptually illustrates the state of the recorded audio and video signals recorded by the device of FIG. 1 through the thickness of a magnetic layer of a recording tape.
Figure 4:
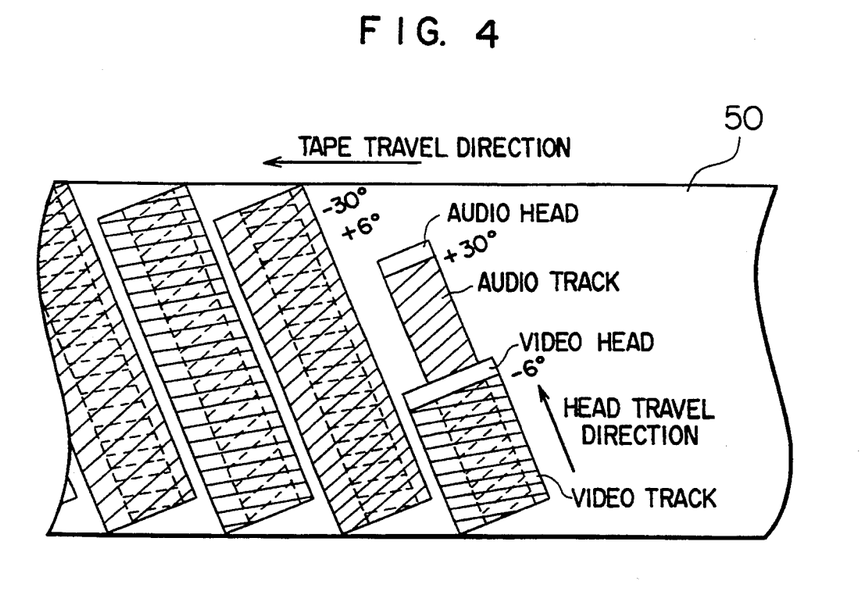
FIG. 4 conceptually illustrates the recorded states of an audio track formed by an audio head of the device of FIG. 1 on a recording tape and of a video track formed by the video head of the device of FIG. 1.

The audio recording signal is amplified by a recording amplifier 24 and the resulting signal is applied through switching circuit 25 to a pair of audio magnetic heads 52a, 52b at opposite or 180-degree positions on a rotary cylinder 51 and recorded into a deep portion of a magnetic layer on a magnetic tape 50, as shown in FIG. 3. The video recording signal is amplified by a recording amplifier 12 and the resulting signal is delivered through switching circuit 13 to video magnetic heads 53a, 53b attached at opposite or 180-degree positions on the rotary cylinder 51 and recorded in a surface portion of the magnetic layer of the magnetic tape 50 in a superimposed manner. At this time, audio magnetic heads 52a, 52b and video magnetic heads 53a, 53b are attached at appropriate heights on the rotary cylinder 51 such that the audio and video tracks are superimposed. The azimuth angles of audio magnetic heads 52a and 52b are set, for example, to +30 and −30 degrees, respectively, and the azimuth angles of video magnetic heads 53a and 53b are set, for example, to −6 and +6 degrees, respectively, as shown in FIG. 4. Reference character R denotes the direction of rotation of rotary cylinder 51 and F the direction of travel of magnetic tape 50.

The above refers to recording and the next refers to reproduction.

The video signal recorded in the surface portion of the magnetic layer of the magnetic tape 50 is reproduced by video magnetic heads 53a, 53b and the resulting signals are inputted through switching circuit 13 to reproducing amplifier 14 where they are amplified and delivered to video signal processor 15. This processor 15 separates the FM luminance signal and down converted chrominance signal using well-known techniques, and FM-demodulates and frequency-converts those signals to generate the original luminance signal and chrominance signal, which are then output from output terminal 16.

The audio signal recorded into the deep portion of the magnetic layer of the magnetic tape 50 is reproduced by audio magnetic heads 52a, 52b and the resulting signals are inputted through switching circuit 25 to reproducing amplifier 26 where they are amplified and delivered to BPFs 27a, 27b and equalizer 35. BPF 27a extracts the left (main) channel audio signal FM-modulated with a 1.3 MHz carrier and FM demodulator 28a FM-demodulates the audio signal to generate the original left (main) channel audio signal, which is then outputted from output terminal 29a. BPF 27b extracts the right (sub) channel audio signal FM-modulated with a 1.7 MHz carrier, and FM demodulator 28b FM-demodulates the audio signal to recover the original right (sub) channel audio signal, which is then outputted from output terminal 29b.

Equalizer 35 increases the high-frequency region component attenuated by over-writing the video signal for erasing purposes to correct the frequency characteristic. BPF 36 extracts the digital audio signal O-QDPSK modulated with a 3 MHz carrier, and O-QDPSK demodulator 37 demodulates the digital audio signal. Digital signal processor 38 processes such signals using error correction, etc., to recover the original digital audio signal, which is then outputted from output terminal 39.

As mentioned above, the video signal, FM audio signal and digital audio signal are recorded in a multiplexed manner and reproduced. Since in the present invention the frequency fB of the bias signal is set to a value which is four times as high as the carrier frequency fp of the digital audio signal, no 5th-order distortion component due to cross modulation of the bias and digital audio signals is reproduced, so that adverse influence of the 5th-order distortion component on the video and FM audio signals is eliminated, which will be described in more detail below.

Figure 5:
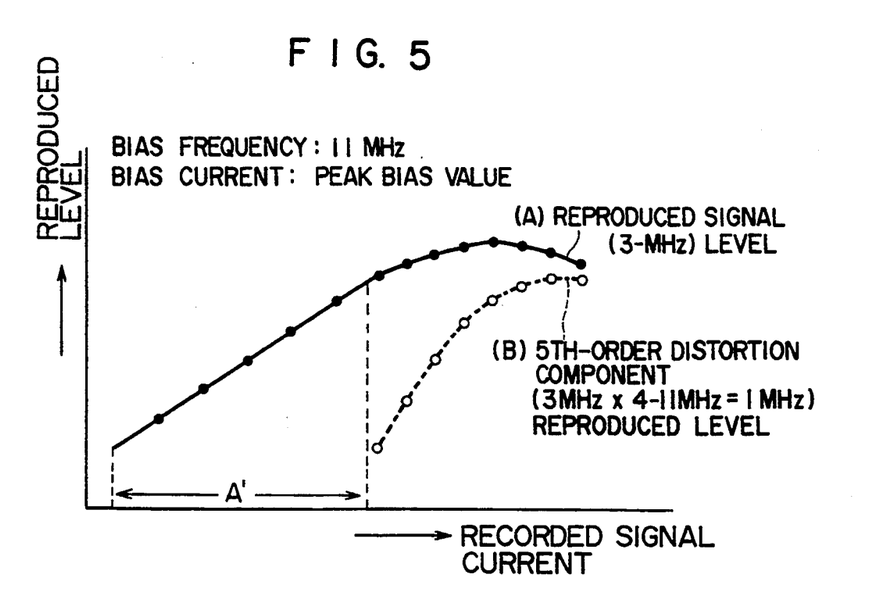
FIG. 5 illustrates the recording current versus reproduced output level characteristic of the device of FIG. 1.

FIG. 5 illustrates the reproduced output characteristic drawn on a logarithmic scale and obtained by recording superimposed a single 3 MHz digital audio signal and an 11 MHz bias signal. The of abscissas represents the recording current for the 3 MHz signal. Reference character (A) denotes the reproduced output level of the 3 MHz signal itself and (B) the reproduced output level of the 5th-order distortion component (4×3 MHz−11 MHz=1 MHz) due to cross modulation of the 3 MHz signal and the 11 MHz bias signal. The recorded level of the bias signal is a constant peak bias value.

The reproduced output level of 3 MHz signal itself shown in (A) linearly increases with the recording current to a certain recording current value, at which the increase rate decreases, and the output level becomes maximum at a point and then decreases with an increasing recording current, thus exhibiting a so-called saturation characteristic. The reproduced output level of the (B) 5th-order distortion component is virtually absent in a linear region A' where there is little recording current for the reproduced signal A. It rapidly increases beyond the region A'.

Of course, there is no problem if the recording current value for the digital audio signal is set to a low recording current value in the linear region, but the digital audio signal has a wide band, so that it is necessary to increase the reproduced output level as much as possible in order to obtain a required C/N ratio. Therefore, the set value of the recording current is required to be set to a recording current value where the reproduced output level becomes maximum. At this time, the 5th-order distortion becomes an issue, as shown in FIG. 5. Since the 5th-order distortion component (of 1 MHz) is in the band of the down converted chrominance signal, the color signal is adversely influenced. While in the particular embodiment the bias frequency is described as 11 MHz, the 5th-order distortion component becomes 1.2 MHz (4×3 MHz−10.8 MHz) in the 10.8 MHz bias frequency proposed in Unexamined Japanese Patent Publication Heisei 1-105301, as mentioned above, and included now in the FM audio signal band, so that the FM audio signal is adversely influenced. If the bias frequency is set to about 11 MHz, as mentioned above, the video or FM audio signal would adversely be influenced by the 5th-order distortion component. It is to be noted that since the 3rd-order distortion component, for example, of 11 MHz−2×3 MHz=5 MHz includes a high frequency, it is not reproduced and the video or FM audio signal is not adversely influenced.

In contrast, in the present invention, the bias frequency fB is set to a value which is 4 times as high as the carrier frequency fp of the digital audio signal, so that the 5th-order distortion component is 0 Hz or a DC component, and is not reproduced and does not adversely influence the video or FM audio signal.

Since the digital audio signal includes a wide-band O-QDPSK-subjected signal, the 5th-order distortion component is likely to be considered as being a wide-band wide spectrum component. However, it is known actually that the quadrupled signal will be a single spectrum signal generally in QPSK and not only in O-QDPSK, so that the 5th-order distortion component will also be a single spectrum.

Figure 6A:
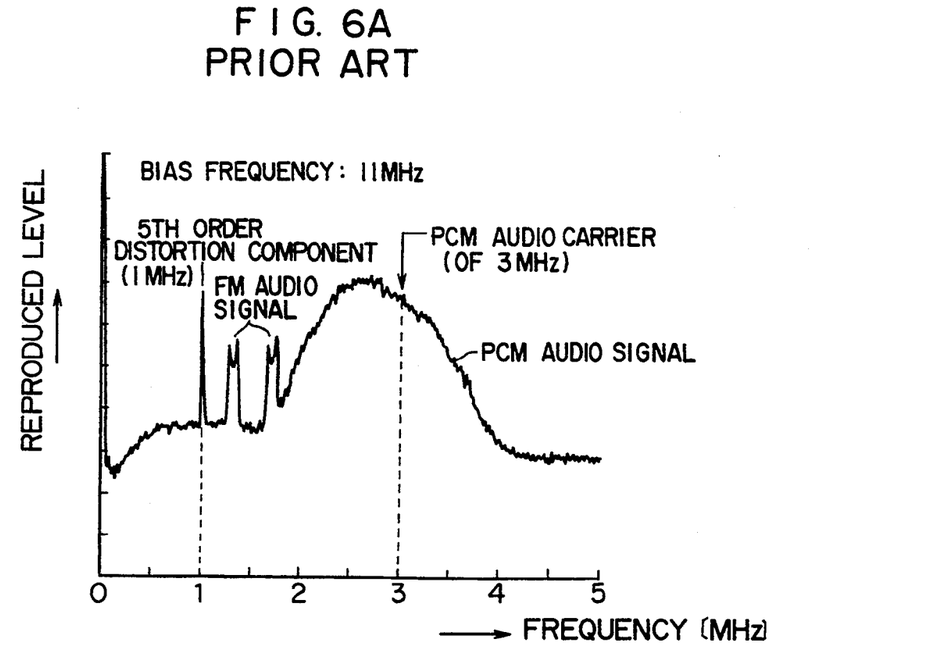
FIGS. 6A, 6B illustrate a conventional reproduced audio signal spectrum characteristic and a spectrum characteristic according to the present invention, respectively.
Figure 6B:
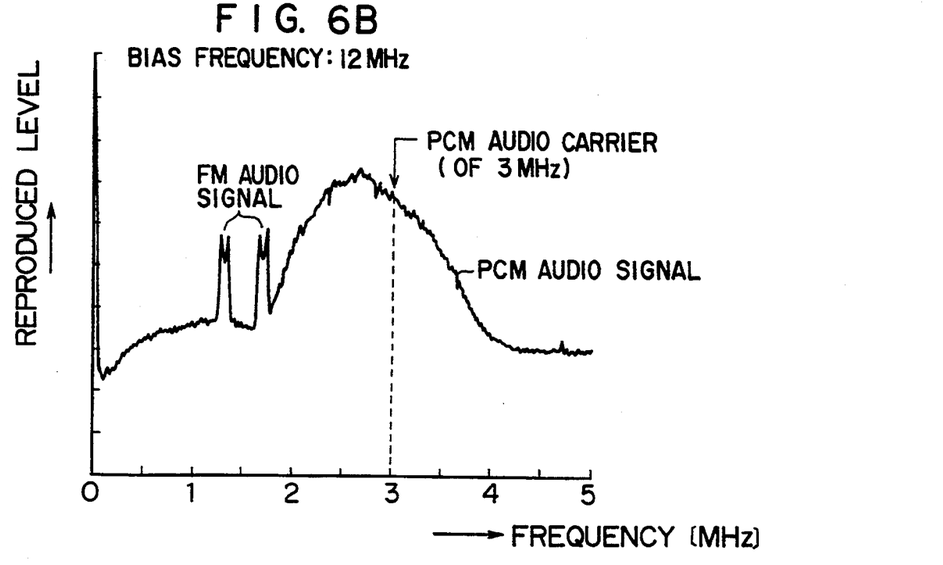

FIGS. 6A, 6B show such a situation. FIGS. 6A, 6B show reproduced spectra for bias frequencies of 11 and 12 MHz, respectively. As shown in FIG. 6A, the 5th-order distortion component appears with a single spectrum at 1 MHz when the bias frequency is 11 MHz. In contrast, when the bias frequency is 12 MHz in the present invention, no 5th-order distortion component appears, as shown in FIG. 6B, because the 5th-order distortion component is a 0 Hz single spectrum and is not reproduced.

While in the embodiment of FIG. 1, the modulation system of the digital audio signal is illustrated as being an O-QDPSK system, the present invention is not limited to this, and is applicable to all QPSK systems where the quadrupled signals will be a single spectrum signal.

Selection of the magnetic gap length of audio heads 52a, 52b which is another feature of the present invention will be described.

Figure 7:
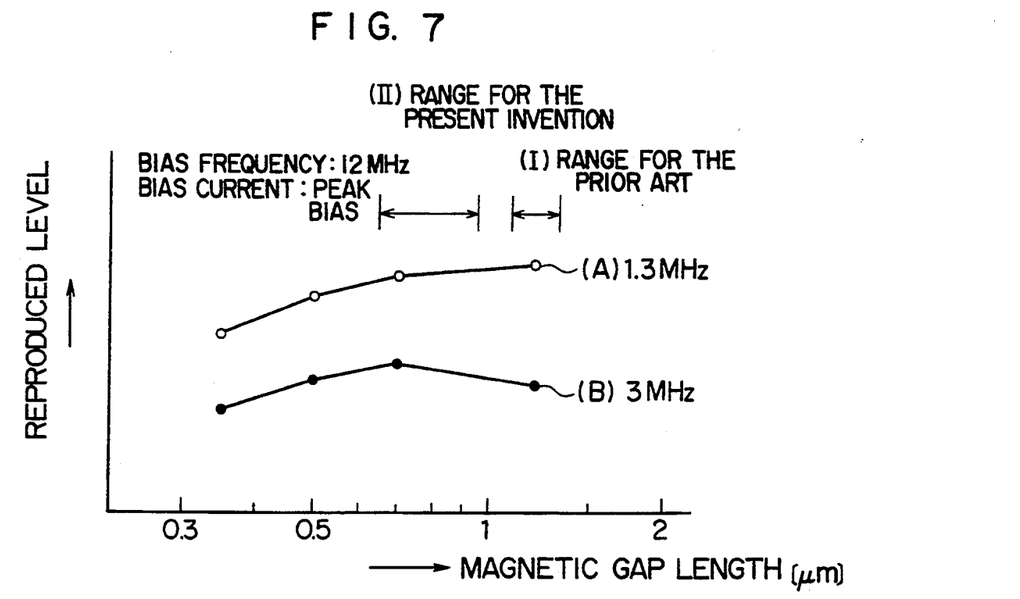
FIG. 7 illustrates the gap length versus reproduced output level characteristic of an audio head.

FIG. 7 illustrates the magnetic gap length versus reproduced output level characteristic of audio heads 52a, 52b where the bias frequency is 12 MHz and the bias current is a constant peak bias value. In FIG. 7, (A) denotes the characteristic obtained by recording and reproducing a single 1.3 MHz signal which is the carrier frequency of an FM audio signal in the left (main) channel. As will be obvious, if the magnetic gap length is in a range of 0.35–1.2 μm, the reproduced output level increases monotonously as the magnetic gap length increases. Therefore, if only the FM audio signal is to be recorded and reproduced, the magnetic gap length in the conventional range of 1.1–1.3 μm shown in (I) may be used without raising any problems. However, there is a problem in the (I) conventional range if recording and reproducing the digital audio signal is to be considered.

The reference character (B) shows the characteristic obtained when a single 3 MHz signal is recorded and reproduced which is the carrier frequency of the digital audio signal. As will be obvious, when the magnetic gap length is up to about 0.7 μm, the reproduced output level increases whereas if the gap length further increases, the reproduced level will conversely be lowered because the gap loss in reproduction increases.

In the present invention, the magnetic gap length is set to 0.65–0.95 μm or one half–one third of the recorded wavelength (5.8 m/s÷3 MHz≈1.93 μm) of the digital audio signal in accordance with the (B) characteristic. Thus, the reproduced output level of the digital audio signal is ensured.

In the setting of the magnetic gap length, the reproduced output level of the 1.3 MHz signal or FM audio signal is lowered compared to that in the conventional gap length, but the band width of the FM audio signal is about 300 kHz which is narrow compared to the band width (about 1.3 MHz) of the digital audio signal. Therefore, the C/N ratio is sufficiently high and there is no problem.

When the FM audio signal and the digital audio signal are to be recorded in a frequency-multiplexed manner, how to set the recording levels of those signals is an important subject, which will be described hereinafter.

Figure 8:
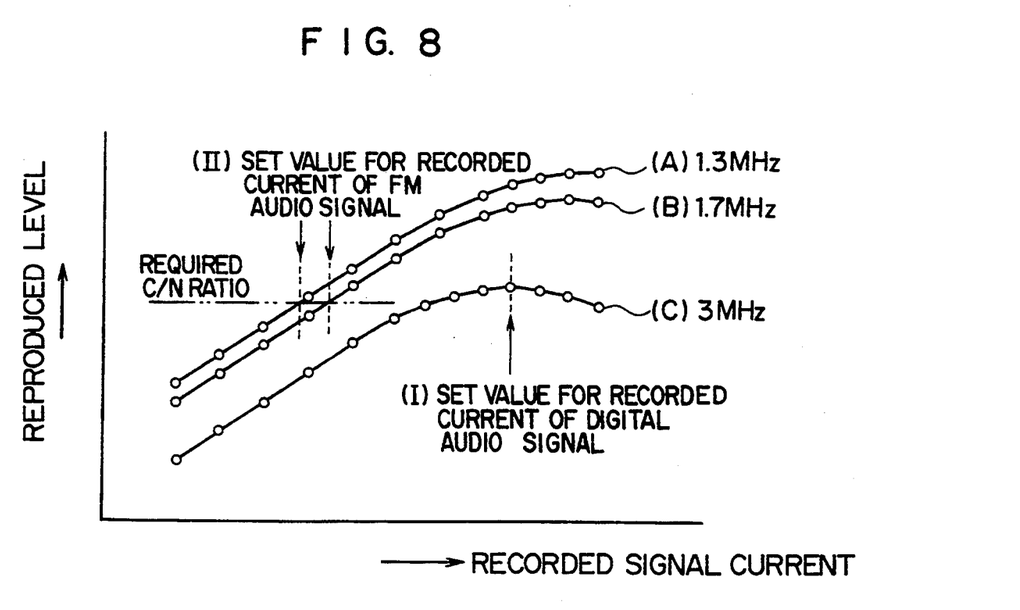
FIG. 8 illustrates a recording current versus reproduced output level characteristic.

FIG. 8 illustrates the recording current versus reproduced output level characteristic of an audio signal. The biasing conditions are the same as those in FIG. 7 with the magnetic gap length of the head being 0.7 μm. In FIG. 8, (A), (B) and (C) denote the characteristics obtained by recording and reproducing simple signals of 1.3, 1.7 and 3 MHz, respectively, where the 1.3 and 1.7 MHz signals each correspond to an FM audio signal, and the 3 MHz signal to a digital audio signal as in FIG. 7. As mentioned above, the band width of the digital audio signal is wide, for example, about 1.3 MHz, so that the reproduced output level is required to be increased as much as possible to obtain a predetermined C/N ratio. Since the band width of the FM audio signal is narrow, for example, about 300 kHz, the reproduced output level may be low because the band width is narrow if the C/N ratios are the same.

Thus, in the present invention, the recording current for the digital audio signal is set to an optimal current value at which the maximum output level is obtained as shown by (I) while the recording current for the FM audio signal is set to a minimum value not less than a current value at which the required C/N ratio, for example, of about 20–26 dB is obtained, as shown in (II). By reducing the recorded level of the FM audio signal as just mentioned above, the generation of the 3rd-order distortion component due to cross modulation of the FM audio signal and the digital audio signal is suppressed.

Figure 9:
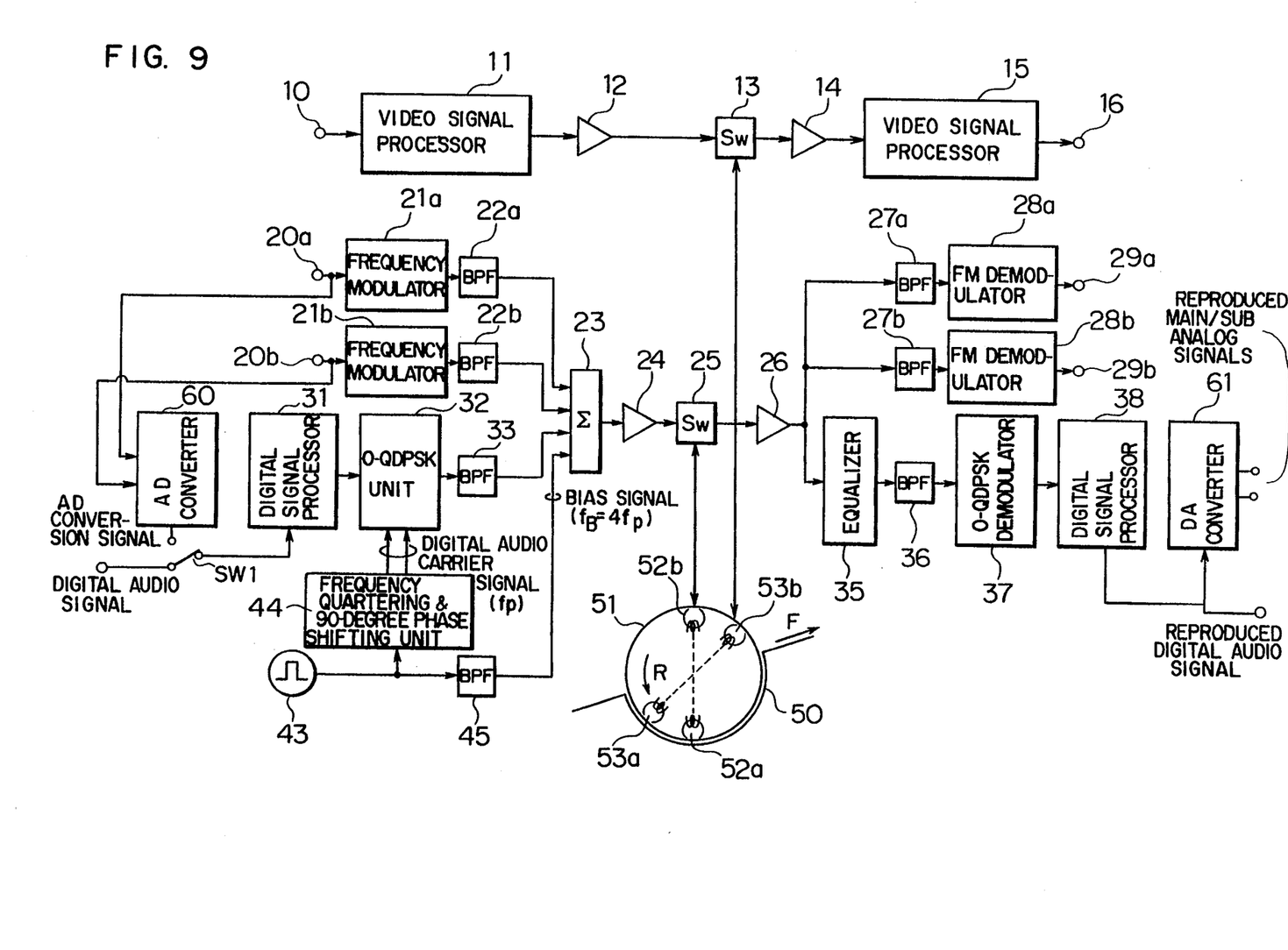
FIGS. 9–11 each are a schematic of another embodiment of the present invention.

FIG. 9 is a block diagram of another embodiment of the present invention which is the same as the first embodiment except for a circuit configuration which generates a bias signal and a quadrature carrier signal fed to O-QDPSK unit 32. The output signal from a master clock generator 43 which oscillates with a frequency which is four times as high as the digital audio carrier is delivered to frequency quartering and 90-degree phase shifting unit 44 which divides the frequency of the master clock by a factor of 4 and generates two carrier signals which are 90 degrees out of phase with each other or quadrature carrier signals, which are then delivered to O-QDPSK unit 32. The output signal of master clock generator 43 is also delivered to BPF 45 which filters out high frequency components to thereby provide a fundamental sinusoidal harmonic bias signal to adder 23.

As mentioned above, the present embodiment is different in structure from the FIG. 1 embodiment except that the bias frequency is set to a value which is four times as high as the carrier frequency of the digital audio signal, and is also the same in effect as the embodiment of FIG. 1. The magnetic gap length of audio magnetic heads 52a, 52b are about 0.7 μm and the recorded levels of the FM audio signal and digital audio signal are set, as mentioned above, of course.

The embodiment of FIG. 9 supposes that it receives only an analog audio signal and not a digital audio signal. In the present embodiment, a main and a sub analog audio signal are inputted to frequency modulators 21a, 21b are inputted in parallel to analog-to-digital converter 60 for conversion to PCM digital signals, which are then inputted to a digital signal processor 31. In reproduction, the output of digital signal processor 38 is subjected to digital-to-analog conversion by digital-to-analog converter 61 to extract the main and sub analog audio signals. If there is a digital audio signal input to the FIG. 9 embodiment and separate from the analog audio signal, the digital audio input is processed directly by digital signal processor 31 and the reproduced digital audio signal is extracted as such from digital signal processor 38 in reproduction, of course, as described in the above embodiments.

In order to make this selection, switch SW1 is provided which selects one of the digital audio signal and the output of A to D converter 60 as an input to digital signal processor 31.

Figure 10:
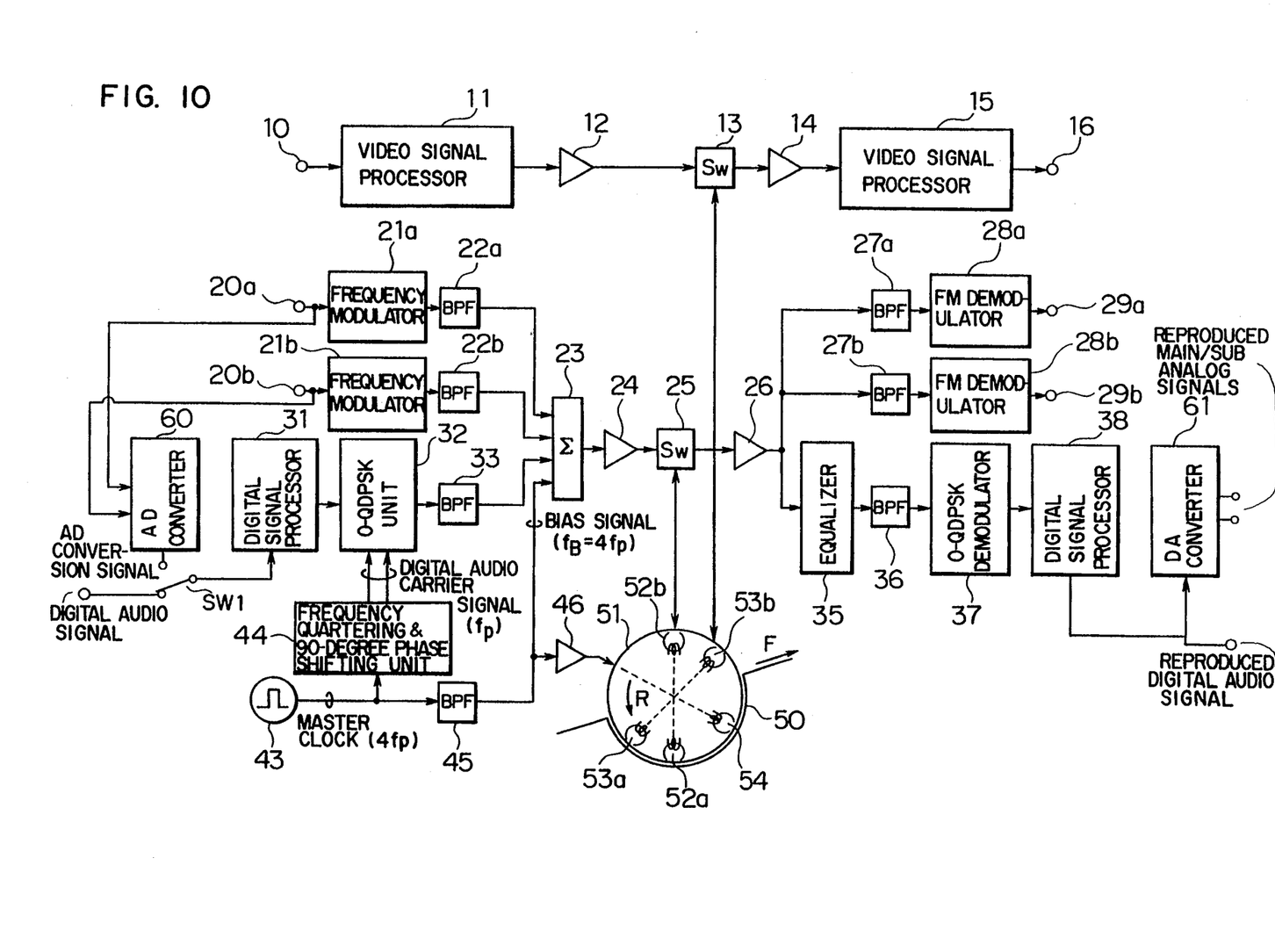

FIG. 10 is a block diagram of another embodiment of the present invention which is characterized by provision of an erase head (usually called flying erase head) 54 which is impressed with a bias signal from amplifier 46. As is well-known, erase head 54 erases a track already recorded before the audio signal and video signal are recorded and is supplied usually with a high frequency of 10 MHz or more. The present embodiment uses the bias signal as the erasing signal to thereby eliminate the need for an erasing signal generator. The prior art related to the FIG. 10 embodiment and solely using the erasing signal as the bias signal is disclosed in Unexamined Japanese Patent Publication Heisei 1-303602. The FIG. 10 embodiment may include AD converter 60 and DA converter 61, as shown.

Figure 11:
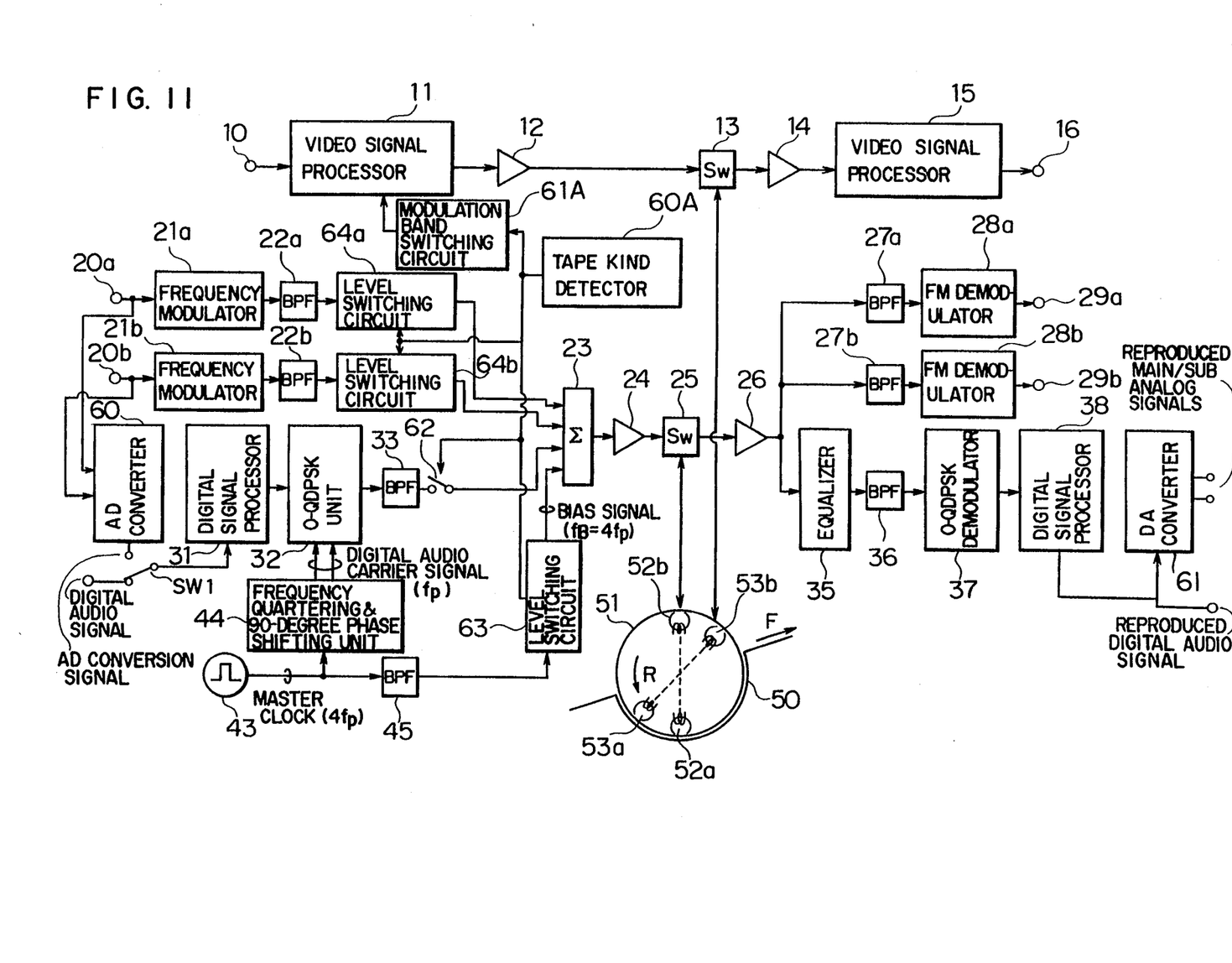

FIG. 11 is a block diagram of a further embodiment of the present invention. In FIG. 11, the numeral 60A denotes a tape kind detector which detects the kind of magnetic tape 50, or, for example, whether the tape has a high coercive force or a low coercive force (for example, for S-VHS or VHS); 61A, a modulation band switching circuit which selects one of a 5.4–7.0 MHz band and a 3.4–4.4 MHz band as the carrier frequency region of the FM luminance signal; 62, a switching circuit which switches on/off the digital audio signal; and 63, 64a, 64b, level switching circuits which change the levels of the bias signal and the FM audio signal.

Tape kind detector 60A used in the embodiment is a well-known one which detects a particular mark or the like formed on the outer surface of a cassette which accommodates a magnetic tape to determine whether the tape is for S-VHS or VHS.

If tape kind detector 60A detects that magnetic tape 50 mounted on the magnetic recording and reproducing device has a high coercive force or is, for example, for a S-VHS tape in the recording operation of the FIG. 11 embodiment, tape kind detector 60A outputs a predetermined type detection signal. Upon receiving this signal, modulation band switching circuit 61A controls video signal processor 11 such that the carrier frequency band of the FM luminance signal is 5.4–7.0 MHz. Switching circuit 62 which has received this detection signal is switched on to deliver the digital audio signal to adder 23. At this time, level changer 63 which has received the detection signal sets the level of the bias signal from BPF 45 at an optimal value for that tape and level changers 64a, 64b set the level of the FM signal at the value mentioned above.

Conversely, if a magnetic tape which has a low coercive force such as a regular VHS tape is used in the magnetic recording and reproducing device, tape kind detector 60A determines that the magnetic tape has a low coercive force and stops outputting the detection signal performed when the magnetic tape having a high coercive force is detected. Thus, modulation band changer 61A controls video signal processor 11 such that the carrier frequency band of the FM luminance signal is 3.4–4.4 MHz. Thus, switching circuit 62 is opened to thereby interrupt inputting the digital audio signal to adder 23. Since level changer 63 receives no detection signal, it is changed to have a bias signal level suitable for the VHS magnetic tape. Also, the level of the FM audio signal is changed to an appropriate value by level changers 64a, 64b which receive no detection signal.

As just mentioned above, since the bias recording is employed even when only the FM audio signal is recorded, which is different from that in the conventional system, a beat (so-called Hi-Fi beat) component due to cross modulation of the left (main) and right (sub) channel FM audio signals is eliminated to thereby improve the image quality. The present embodiment may include AD converter 60 and DA converter 61 similar to those in the FIG. 9 embodiment.

According to the present embodiment, as mentioned above, the bias frequency is set to a value which is four times as high as the carrier frequency of the digital audio signal to thereby reproduce no 5th-order distortion component due to cross modulation of the bias signal and the digital audio signal and hence to exert no adverse influence on the video or FM audio signal.

The reproduced output level of the digital audio signal is increased and the C/N ratio is improved by setting the magnetic gap length of the audio heads to one half to one third of the recorded wavelength of the digital audio signal.

Generation of an interference signal due to cross modulation of the digital audio signal and the FM audio signal is suppressed and the image quality is improved by setting the recording current for the digital audio signal to an optimal recording current value and the recording current for the FM audio signal to a minimum current value which ensures the required C/N ratio.

Generation of an interference signal due to cross modulation of FM audio signals is prevented and the image quality is improved by bias recording the FM audio signals even in a conventional tape having a low coercive force.

What is claimed is:

1. A magnetic recording method comprising the steps of:
    performing a quadrature phase shift keying operation on a digital information signal,
    superimposing a high frequency bias signal on the quadrature phase shift keyed digital information signal,
    recording a signal resulting from the superimposing step in a deep portion of a magnetic layer of a magnetic tape with a first rotary head, and
    recording a video a signal in a surface portion of the magnetic layer above a track formed by recording the signal resulting from the superimposing step with a second rotary head which is different in azimuth angle from the first rotary head,
    wherein a frequency of the high frequency bias signal is set to a value which is four times as high as a carrier frequency of the quadrature phase shift keyed digital information signal.

2. A magnetic recording method comprising the steps of:
    performing a quadrature phase shift keying operation on a digital information signal,
    frequency-modulating an audio signal,
    multiplexing the quadrature phase shift keyed digital information signal and the frequency-modulated audio signal in a frequency-divisional manner,
    superimposing a high frequency bias signal on a signal resulting from the multiplexing step,
    recording a signal resulting from the superimposing step in a deep portion of a magnetic layer of a magnetic tape with a first rotary head, and
    recording a video signal in a surface portion of the magnetic layer above a track formed by recording the signal resulting from the superimposing step with a second rotary head which is different in azimuth angle from the first rotary head,
    wherein a frequency of the high frequency bias signal is set to a value which is four times as high as a carrier frequency of the quadrature phase shift keyed digital information signal.

3. A magnetic recording method according to claim 2, wherein the digital information signal is the audio signal or a second audio signal subjected to analog-to-digital conversion using pulse code modulation.

4. A magnetic recording method according to claim 3, wherein a magnetic gap length of the first rotary head is one half to one third of the a recording wavelength of the quadrature phase shift keyed digital information signal.

5. A magnetic recording method according to claim 3, wherein a recording level of the quadrature phase shift keyed digital information signal is set in the vicinity of an optimal recording level at which a reproduced output level of the quadrature phase shift keyed digital information signal is maximized, and wherein a recording level of the frequency-modulated audio signal is set to a value at which a reproduced output level of the frequency-modulated audio signal is a lowest level providing a required signal characteristic.

6. A magnetic recording method according to claim 3, wherein the high frequency bias signal is used as an erasing signal for erasing the magnetic tape.

7. A magnetic recording method comprising the steps of:
    detecting whether a magnetic tape to be used in a recording operation has a low coercive force or a high coercive force,
    frequency-modulating a luminance signal using a first carrier frequency band when the magnetic tape has a low coercive force, and using a second carrier frequency band higher than the first carrier frequency band when the magnetic tape has a high coercive force,
    down-converting a chrominance signal,
    multiplexing the frequency-modulated luminance signal and the down-converted chrominance signal to produce a video signal,
    performing a quadrature phase shift keying operation on a digital information signal,
    frequency-modulating an audio signal,
    multiplexing the quadrature phase shift keyed digital information signal and the frequency-modulated audio signal only when the magnetic tape has a high coercive force,
    superimposing a high frequency bias signal on the multiplexed quadrature phase shift keyed digital information signal and frequency-modulated audio signal when the magnetic tape has a high coercive force, and on the frequency-modulated audio signal when the magnetic tape has a low coercive force,
    recording a signal resulting from the superimposing step in a deep portion of a magnetic layer of the magnetic tape with a first rotary head, and
    recording the video signal in a surface portion of the magnetic layer above a track formed by recording the signal resulting from the superimposing step with a second rotary head which is different in azimuth angle from the first rotary head.

8. A magnetic recording method according to claim 7, wherein a frequency of the high frequency bias signal is set to a value which is four times as high as a carrier frequency of the quadrature phase shift keyed digital information signal.

9. A magnetic recording method according to claim 8, wherein the digital information signal is the audio signal which is subjected to analog-to-digital conversion by pulse code modulation.

10. A magnetic recording method according to claim 9, wherein the high frequency bias signal is used as an erasing signal for erasing the magnetic tape.

11. A magnetic recording and reproducing device comprising:
    means for performing a quadrature phase shift keying operation on a digital information signal,
    means for superimposing a high frequency bias signal on an output signal of the performing means,
    first rotary head means having a first azimuth angle for recording an output signal of the superimposing means in a deep portion of a magnetic layer of a magnetic tape and reproducing the recorded output signal, and
    second rotary head means having a second azimuth angle for recording a video signal in a surface portion of the magnetic layer above a track formed by recording the output signal of the superimposing means and reproducing the recorded video signal,
    wherein a frequency of the high frequency bias signal is set to a value which is four times as high as a carrier frequency of the quadrature phase shift keyed digital information signal.

12. A magnetic recording and reproducing device according to claim 11, further comprising:

a carrier oscillator for outputting a carrier having a predetermined frequency, a 90-degree phase shifter for receiving the carrier and shifting the carrier by 90 degrees, and a circuit for quadrupling the frequency of the carrier, wherein the performing means receives the carrier and the shifted carrier and performs the quadrature phase shift keying operation on the digital information signal using the carrier and the shifted carrier, and wherein the superimposing means receives an output signal of the quadrupling circuit as the bias signal.

13. A magnetic recording and reproducing device according to claim 11, further comprising:

a master clock generator for generating a master clock having a predetermined frequency, a frequency-quartering and 90-degree phase shifting unit for receiving the master clock and outputting a pair of quadrature carrier signals each having a frequency one-quarter of the frequency of the master clock and being 90 degrees out of phase with each other, and a band pass filter for receiving the master clock and outputting only a fundamental sinusoidal harmonic by filtering out higher harmonics of the master clock, wherein the performing means receives the quadrature carrier signals from the frequency quartering and 90-degree phase shifting unit and performs the quadrature phase shift keying operation on the digital information signal using the quadrature carrier signals, and wherein the superimposing means receives as the bias signal the fundamental sinusoidal harmonic from the band pass filter.

14. A magnetic recording and reproducing device comprising:

first modulating means for frequency-modulating an audio signal, second modulating means for performing a quadrature phase shift keying operation on a digital information signal, means for multiplexing output signals from the first and second modulating means in a frequency-divisional manner, means for superimposing a high frequency bias signal on an output signal of the multiplexing means, first rotary head means having a first azimuth angle for recording an output signal of the superimposing means in a deep portion of a magnetic layer of a magnetic tape and reproducing the recorded output signal, and second rotary head means having a second azimuth angle for recording a video signal in a surface portion of the magnetic layer above a track formed by recording the output signal of the superimposing means and reproducing the recorded video signal, wherein a frequency of the high frequency bias signal is set to a value which is four times as high as a carrier frequency of the quadrature phase shift keyed digital information signal.

15. A magnetic recording and reproducing device according to claim 14, further comprising:

a carrier oscillator for outputting a carrier having a predetermined frequency, a 90-degree phase shifter for receiving the carrier and shifting the carrier by 90 degrees, and a circuit for quadrupling the frequency of the carrier, wherein the second modulating means receives the carrier and the shifted carrier and performs the quadrature phase shift keying operation on the digital information signal using the carrier and the shifted carrier, and wherein the superimposing means receives an output signal of the quadrupling circuit as the bias signal.

16. A magnetic recording and reproducing device according to claim 14, further comprising:

a master clock generator for generating a master clock having a predetermined frequency, a frequency quartering and 90-degree phase shifting unit for receiving the master clock and outputting a pair of quadrature carrier signals each having a frequency one-quarter of the frequency of the master clock and being 90 degrees out of phase with each other, and a band pass filter for receiving the master clock and outputting only a fundamental sinusoidal harmonic by filtering out higher harmonics of the master clock, wherein the second modulating means receives the quadrature carrier signals from the frequency quartering and 90-degree phase shifting unit and performs the quadrature phase shift keying operation on the digital information signal using the quadrature carrier signals, and wherein the superimposing means receives as the bias signal the fundamental sinusoidal harmonic from the band pass filter.

17. A magnetic recording and reproducing device according to claim 14, further comprising analog-to-digital conversion means for subjecting the audio signal or a second audio signal to analog-to-digital conversion using pulse code modulation, an output signal from the analog-to-digital conversion means being supplied as the digital information signal to the second modulating means.

18. A magnetic recording and reproducing device according to claim 17, wherein a magnetic gap length of the first rotary head means is set to one half to one third of a recording wavelength of the quadrature phase shift keyed digital information signal.

19. A magnetic recording and reproducing device according to claim 17, wherein a recording level of the quadrature phase shift keyed digital information signal is set in the vicinity of an optimal recording level at which a reproduced output level of the quadrature phase shift keyed digital information signal is maximized, and wherein a recording level of the frequency-modulated audio signal is set to a value at which a reproduced output level of the frequency-modulated audio signal is a lowest level providing a required signal characteristic.

20. A magnetic recording and reproducing device comprising:

means for performing a quadrature phase shift keying operation on a digital information signal, means for superimposing a high frequency bias signal on an output signal of the performing means, first rotary head means having a first azimuth angle for recording an output signal of the superimposing means in a deep portion of a magnetic layer of a magnetic tape and reproducing the recorded output signal, second rotary head means having a second azimuth angle for recording a video signal in a surface portion of the magnetic layer above a track formed by recording the output signal of the superimposing means and reproducing the recorded video signal, and rotary erasing head means for receiving an erasing signal and erasing the output signal and the video signal recorded in the magnetic layer using the erasing signal, wherein a frequency of the high frequency bias signal is set to a value which is four times as high as a carrier frequency of the quadrature phase shift keyed digital information signal, and wherein the rotary erasing head means receives the high frequency bias signal as the erasing signal.

21. A magnetic recording and reproducing device according to claim 20, further comprising:

a carrier oscillator for outputting a carrier having a predetermined frequency, a 90-degree phase shifter for receiving the carrier and shifting the carrier by 90 degrees, and a circuit for quadrupling the frequency of the carrier, wherein the performing means receives the carrier and the shifted carrier and performs the quadrature phase shift keying operation on the digital information signal using the carrier and the shifted carrier, and wherein the superimposing means receives an output signal of the quadrupling circuit as the bias signal.

22. A magnetic recording and reproducing device according to claim 20, further comprising:

a master clock generator for generating a master clock having a predetermined frequency, a frequency quartering and 90-degree phase shifting unit for receiving the master clock and outputting a pair of quadrature carrier signals each having a frequency one-quarter of the frequency of the master clock and being 90 degrees out of phase with each other, and a band pass filter for receiving the master clock and outputting only a fundamental sinusoidal harmonic by filtering out higher harmonics of the master clock, wherein the performing means receives the quadrature carrier signals from the frequency quartering and 90-degree phase shifting unit and performs the quadrature phase shift keying operation on the digital information signal using the quadrature carrier signals, and wherein the superimposing means receives as the bias signal the fundamental sinusoidal harmonic from the band pass filter.

23. A magnetic recording and reproducing device comprising:

first modulating means for frequency-modulating an audio signal, second modulating means for performing a quadrature phase shift keying operation on a digital information signal, means for multiplexing output signals from the first and second modulating means in a frequency-divisional manner, means for superimposing a high frequency bias signal on an output signal of the multiplexing means, first rotary head means having a first azimuth angle for recording an output signal of the superimposing means in a deep portion of a magnetic layer of a magnetic tape and reproducing the recorded output signal, second rotary head means having a second azimuth angle for recording a video signal in a surface portion of the magnetic layer above a track formed by recording the output signal of the superimposing means and reproducing the recorded video signal, and rotary erasing head means for receiving an erasing signal and erasing the output signal and the video signal recorded in the magnetic layer using the erasing signal, wherein a frequency of the high frequency bias signal is set to a value which is four times as high as a carrier frequency of the quadrature phase shift keyed digital information signal, and wherein the rotary erasing head means receives the high frequency bias signal as the erasing signal.

24. A magnetic recording and reproducing device according to claim 23, further comprising:

a carrier oscillator for outputting a carrier having a predetermined frequency, a 90-degree phase shifter for receiving the carrier and shifting the carrier by 90 degrees, and a circuit for quadrupling the frequency of the carrier, wherein the second modulating means receives the carrier and the shifted carrier and performs the quadrature phase shift keying operation on the digital information signal using the carrier and the shifted carrier, and wherein the superimposing means receives an output signal of the quadrupling circuit as the bias signal.

25. A magnetic recording and reproducing device according to claim 23, further comprising:

a master clock generator for generating a master clock having a predetermined frequency, a frequency quartering and 90-degree phase shifting unit for receiving the master clock and outputting a pair of quadrature carrier signals each having a frequency one-quarter of the frequency of the master clock and being 90 degrees out of phase with each other, and a band pass filter for receiving the master clock and outputting only a fundamental sinusoidal harmonic by filtering out higher harmonics of the master clock, wherein the second modulating means receives the quadrature carrier signals from the frequency quartering and 90-degree phase shifting unit and performs the quadrature phase shift keying operation on the digital information signal using the quadrature carrier signals, and wherein the superimposing means receives as the bias signal the fundamental sinusoidal harmonic from the band pass filter.

26. A magnetic recording and reproducing device according to claim 23, further comprising analog-to-digital conversion means for subjecting the audio signal or a second audio signal to analog-to-digital conversion using pulse code modulation, an output signal from the analog-to-digital conversion means being supplied as the digital information signal to the second modulating means.

27. A magnetic recording and reproducing device according to claim 26, wherein a magnetic gap length of the first rotary head means is set to one half to one third of a recording wavelength of the quadrature phase shift keyed digital information signal.

28. A magnetic recording and reproducing device according to claim 26, wherein a recording level of the quadrature phase shift keyed digital information signal is set in the vicinity of an optimal recording level at which a reproduced output level of the quadrature phase shift keyed digital information signal is maximized, and wherein a recording level of the frequency-modulated audio signal is set to a value at which a reproduced output level of the frequency-modulated audio signal is a lowest level providing a required signal characteristic.

29. A magnetic recording and reproducing device comprising:
    means for detecting whether a magnetic tape to be used in a recording operation has a low coercive force or a high coercive force,
    means for frequency-modulating a luminance signal using a first carrier frequency band when the magnetic tape has a low coercive force, and using a second carrier frequency band higher than the first carrier frequency band when the magnetic tape has a high coercive force,
    means for down-converting a chrominance signal,
    means for multiplexing the frequency-modulated luminance signal and the down-converted chrominance signal to produce a video signal,
    means for performing a quadrature phase shift keying operation on a digital information signal,
    means for frequency-modulating an audio signal,
    means for multiplexing the quadrature phase shift keyed digital information signal and the frequency-modulated audio signal only when the magnetic tape has a high coercive force,
    means for superimposing a high frequency bias signal on the multiplexed quadrature phase shift keyed digital information signal and frequency-modulated audio signal when the magnetic tape has a high coercive force, and on the frequency-modulated audio signal when the magnetic tape has a low coercive force,
    first rotary head means having a first azimuth angle for recording an output signal of the superimposing means in a deep portion of a magnetic layer of the magnetic tape and reproducing the recorded output signal, and
    second rotary head means having a second azimuth angle different from the first azimuth angle for recording the video signal in a surface portion of the magnetic layer above a track formed by recording the output signal of the superimposing means and reproducing the recorded video signal.

30. A magnetic recording and reproducing device according to claim 29, wherein a frequency of the high frequency bias signal is set to a value which is four times as high as a carrier frequency of the quadrature phase shift keyed digital information signal.

31. A magnetic recording and reproducing device according to claim 30, further comprising:
    a carrier oscillator for outputting a carrier having a predetermined frequency,
    a 90-degree phase shifter for receiving the carrier and shifting the carrier by 90 degrees, and
    a circuit for quadrupling the frequency of the carrier,
    wherein the quadrature phase shift keying operation performing means receives the carrier and the shifted carrier and performs the quadrature phase shift keying operation on the digital information signal using the carrier and the shifted carrier, and
    wherein the superimposing means receives an output signal of the quadrupling circuit as the bias signal.

32. A magnetic recording and reproducing device according to claim 30, further comprising:
    a master clock generator for generating a master clock having a predetermined frequency,
    a frequency quartering and 90-degree phase shifting unit for receiving the master clock and outputting a pair of quadrature carrier signals each having a frequency one-quarter of the frequency of the master clock and being 90 degrees out of phase with each other, and
    a band pass filter for receiving the master clock and outputting only a fundamental sinusoidal harmonic by filtering out higher harmonics of the master clock,
    wherein the quadrature phase shift keying operation performing means receives the quadrature carrier signals from the frequency quartering and 90-degree phase shifting unit and performs the quadrature phase shift keying operation on the digital information signal using the quadrature carrier signals, and
    wherein the superimposing means receives as the bias signal the fundamental sinusoidal harmonic from the band pass filter.

33. A magnetic recording and reproducing device according to claim 30, further comprising analog-to-digital conversion means for subjecting the audio signal or a second audio signal to analog-to-digital conversion using pulse code modulation, an output signal from the analog-to-digital conversion means being supplied as the digital information signal to the quadrature phase shift keying operation performing means.

34. A magnetic recording and reproducing device according to claim 33, wherein a magnetic gap length of the first rotary head means is set to one half to one third of a recording wavelength of the quadrature phase shift keyed digital information signal.

35. A magnetic recording and reproducing device according to claim 33, wherein a recording level of the quadrature phase shift keyed digital information signal is set in the vicinity of an optimal recording level at which a reproduced output level of the quadrature phase shift keyed digital information signal is maximized, and wherein a recording level of the frequency-modulated audio signal is set to a value at which a reproduced output level of the frequency-modulated audio signal is a lowest level providing a required signal characteristic.

36. A magnetic recording and reproducing device comprising:
    first modulating means for frequency-modulating an audio signal,
    second modulating means for performing a quadrature phase shift keying operation on a digital information signal,
    means for multiplexing output signals from the first and second modulating means in a frequency-divisional manner,
    means for superimposing a high frequency bias signal on an output signal of the multiplexing means,
    first rotary head means having a first azimuth angle for recording an output signal of the superimposing means in a deep portion of a magnetic layer of a magnetic tape and reproducing the recorded output signal, and
    second rotary head means having a second azimuth angle for recording a video signal in a surface portion of the magnetic layer above a track formed by recording the output signal of the superimposing means and reproducing the recorded video signal, wherein a magnetic gap length of the first rotary head means is set to one half to one third of a recording wavelength of the quadrature phase shift keyed digital information signal.

37. A magnetic recording and reproducing device comprising:

first modulating means for frequency-modulating an audio signal, second modulating means for performing a quadrature phase shift keying operation on a digital information signal, means for multiplexing output signals from the first and second modulating means in a frequency-divisional manner, means for superimposing a high frequency bias signal on an output signal of the multiplexing means, first rotary head means having a first azimuth angle for recording an output signal of the superimposing means in a deep portion of a magnetic layer of a magnetic tape and reproducing the recorded output signal, and second rotary head means having a second azimuth angle for recording a video signal in a surface portion of the magnetic layer above a track formed by recording the output signal of the superimposing means and reproducing the recorded video signal, wherein a recording level of the quadrature phase shift keyed digital information signal is set in the vicinity of an optimal recording level at which a reproduced output level of the quadrature phase shift keyed digital information signal is maximized, and wherein a recording level of the frequency-modulated audio signal is set to a value at which a reproduced output level of the frequency-modulated audio signal is a lowest level providing a required signal characteristic.

* * * * *